Jan. 19, 1971     W. R. FORMAN     3,555,663

METHOD OF MAKING AN ANNULAR GLASS-TO-METAL JOINT

Filed Dec. 9, 1968

*INVENTOR.*
WILLIS R. FORMAN
BY
ROY MILLER
ATTORNEY.

United States Patent Office 3,555,663
Patented Jan. 19, 1971

3,555,663
METHOD OF MAKING AN ANNULAR GLASS-TO-METAL JOINT
Willis R. Forman, San Diego, Calif., assignor to the United States of America as represented by the Secretary of the Navy
Filed Dec. 9, 1968, Ser. No. 782,304
Int. Cl. B21d 39/02
U.S. Cl. 29—463                                2 Claims

ABSTRACT OF THE DISCLOSURE

A glass-to-metal joint for use under extreme pressure wherein the abutting glass edge is ground to a radius equal to one-half the thickness of the glass, fire-polished, and fitted into a mating groove provided in a reinforced plastic band attached to the edge of the metal element. This structure is used in joining a glass hemisphere to a steel cylinder in a submersible.

GOVERNMENT INTEREST

The invention described herein may be manufactured and used by or for the Government of the United States of America for governmental purposes without the payment of any royalties thereon or therefor.

BACKGROUND OF THE INVENTION

In the joining of glass and metal structures interface gaskets have been interposed between the two mating flat surfaces to assist in the prevention of plastic deformation of one or both bodies where compressive stresses exceed the specific stress values and to smooth out the stress concentration so the glass won't crack. Joints between a metal and a glass plate adaptable for use under extreme pressure present a problem. In flat-edged joints, the strength of the glass portion of a glass and steel structure can withstand only one-sixth to one-fourth the pressure that it could withstand in a comparable all glass structure due to uneven stress distribution and tension which develops along the joint. Glass has tremendous compressional strength and it is only when you put a little tension in it that it will crack. In the deep ocean, with tremendous hydrostatic pressure pushing on a compressive load, glass is good. But there is a problem anytime one piece of glass is put against a piece of metal. Never do the two pieces fit smoothly with respect to one another and little stress combinations arise which crack the glass. Glass is one of those materials which, if it fails, it fails completely. The present invention provides a means for joining glass to metal, particularly steel, or glass-to-glass, to make a structure which can withstand compressive stresses and thus eliminate cracking due to the uneven distribution of pressure and tension in and along the joint.

SUMMARY OF THE INVENTION

The invention relates to a joint, more particularly to a glass-to-metal or glass-to-glass joint for use under extreme pressure which comprises grinding the abutting glass edge to a radius equal to one-half the thickness of the glass, fire-polishing said glass edge, and fitting said polished edge into a mating groove provided in a reinforced plastic band attached to the edge of the abutting metal.

The general purpose of this invention is to provide a glass-to-metal joint which permits minor rotation of the glass member so as to minimize stress due to plastic deformation under high pressure or sudden impact and to minimize stress due to any radial deformation mismatch between the glass and the metal which may occur. Another object is to provide a glass-to-metal joint for use in submersibles which gives half again as much surface area for distribution of pressure and provides even stress distribution along the joint. Other aspects, advantages and objects of this invention will be apparent when considered in connection with the accompanying drawing.

DESCRIPTION OF THE INVENTION

Figure 1:
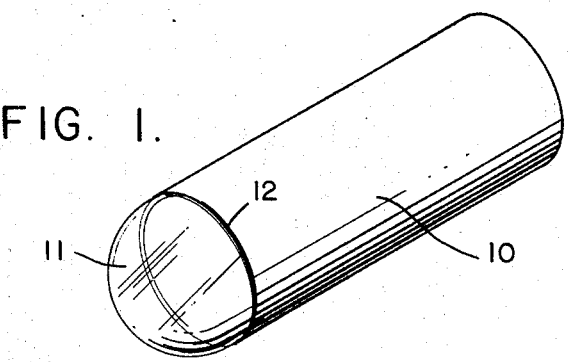
FIG. 1 is a longitudinal section of an embodiment in accordance with the mode of this invention.
Figure 2:
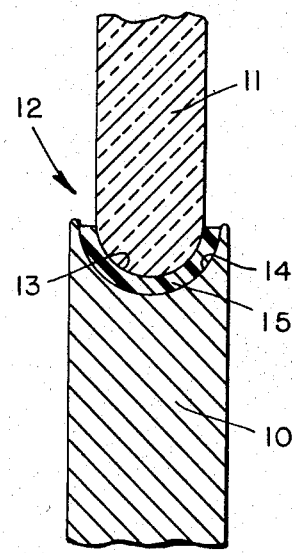
FIG. 2 is a detailed view illustrating the mode of structuring the embodiment shown in FIG. 1.

Referring now to the drawing there is shown in FIG. 1 a steel cylinder 10 and a glass hemisphere 11 joined at point 12 by the method of the present invention. The mode is shown in detail in FIG. 2 which comprises grinding the abutting edge 13 of glass hemisphere 11 to a radius equal to one-half the thickness of glass 11, then fire-polishing the edge 13 which is fitted into a mating groove 14 which has been formed along the abutting edge of cylinder 10. A plastic gasket 15 is positioned in groove 14 between the glass edge 13 and the steel to act as a bearing surface. With this joint the glass and steel can withstand pressures equivalent to those of an all glass structure.

Figure 3:
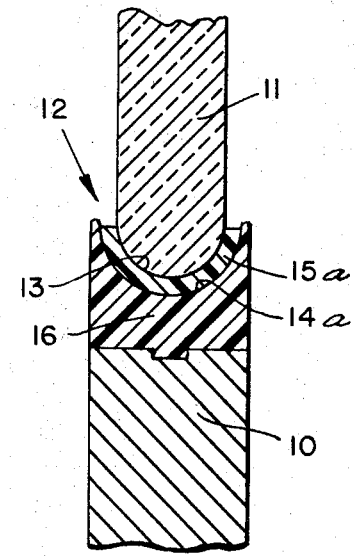
FIG. 3 is a detailed view illustrating the preferred mode of structuring an embodiment in accordance with the present inivention.

In FIG. 3 there is shown a preferred embodiment of the mode of the present invention wherein a glass-reinforced plastic band 16 is shown fitted around the edge of steel cylinder 10. A groove designated 14a is cut in reinforced band 16 to mate with the rounded edge 13 of glass hemisphere 11 (ground and fire-polished as herein described). A gasket 15a as shown composed of a material which will yield to glass may be positioned between glass edge 13 and groove 14a to act as a bearing surface.

Figure 5:
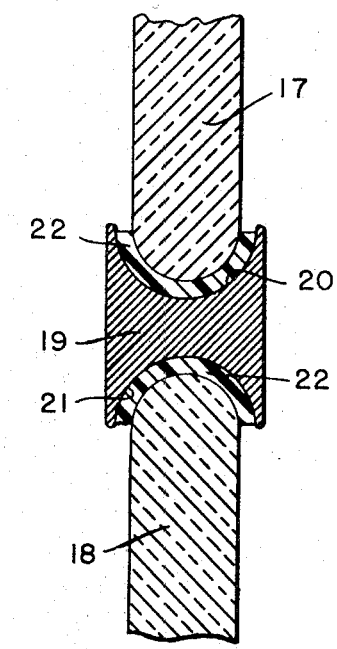
FIG. 5 is a detailed view illustrating the mode of structuring the embodiment shown in FIG. 4.
Figure 4:
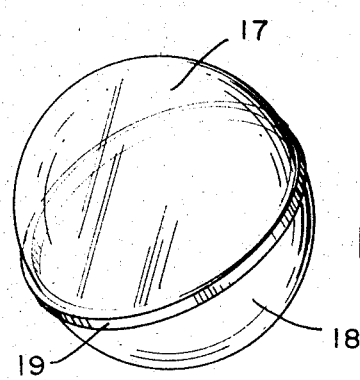
FIG. 4 is a view of another embodiment in accordance with the mode of this invention.

The mode of this invention is shown in the structure of another embodiment shown in FIG. 4 wherein two glass mating hemispheres designated 17 and 18 are shown joined together by means of a steel band 19. As shown in detail in FIG. 5 band 19 is provided with grooves 20 and 21 shown on each edge of band 19 machined to mate with the rounded edges provided on hemispheres 17 and 18. The edges of the hemispheres have been ground and fire-polished in accordance with the method described hereinabove. Gaskets designated generally by 22 formed of suitable resistant material are positioned in grooves 20 and 21 so as to be interposed between the steel and glass edges to minimize stress due to plastic deformation under high pressure or sudden impact and to minimize stress due to any radial deformation mismatch between the glass and band which may occur. This means of joining either glass to metal or glass to glass eliminates cracking of the glass due to uneven distribution of pressure and tension which develops in and along the joint. This method provides a means for joining glass hemispheres successfully to form fairly large spheres which heretofore created great manufacturing problems. Any time one piece of glass is put against another piece of glass it is difficult to get the two pieces of glass to carry the load. The two pieces of glass very seldom fit perfectly smooth with respect to each other. By the present method of forming a glass-to-glass joint the little stress combinations which arise which can conceivably crack the glass are avoided.

The band is made of steel or other suitable metal. Glass-reinforced plastic has also proved successful to hold the metal and glass edges together and is commercially available.

The preferred gasket is one formed from sulfur-free rubber, Teflon-sheathed rubber and Teflon (polytetrafluoroethylene). Other suitable commercially available materials may be used.

What is claimed is:

1. A method for forming a glass-to-metal joint between a glass end closure and an annular metal member adapted to withstand extreme pressure which comprises:
   grinding the edge of the glass end closure which abuts the annular metal member to a radius equal to one-half the thickness of the glass to form a rounded edge;
   fire-polishing said edge;
   cutting a groove in the abutting annular metal member to mate with said polished glass edge; and
   fitting said rounded glass edge into said groove.

2. The method in accordance with claim 1 wherein a plastic gasket is interposed between said glass edge and said groove.

References Cited

UNITED STATES PATENTS

| | | | |
|---|---|---|---|
| 766,514 | 8/1904 | Nolan | 65—120 |
| 1,230,548 | 6/1917 | Wells | 65—61X |
| 1,458,883 | 6/1923 | Hunziker | 220—82 |
| 1,953,843 | 4/1934 | Wilson | 114—16.5 |
| 2,289,037 | 7/1942 | Poglein | 220—24 |
| 3,107,161 | 10/1963 | Bivens et al. | 65—120X |
| 3,393,988 | 7/1968 | Blumenthal | 65—61 |

CHARLIE T. MOON, Primary Examiner

U.S. Cl. X.R.

52—80; 65—61; 114—16.5; 220—24; 287—189.36